United States Patent
Tillman

(10) Patent No.: US 12,189,480 B2
(45) Date of Patent: Jan. 7, 2025

(54) SYSTEM AND METHOD FOR QUICK APPLIANCE RECOVERY

(71) Applicant: Barracuda Networks, Inc., Campbell, CA (US)

(72) Inventor: Nicholas Tillman, Morgan Hill, CA (US)

(73) Assignee: Barracuda Network, Inc., Campbell, CA (US)

(*) Notice: Subject to any disclaimer, the term of this patent is extended or adjusted under 35 U.S.C. 154(b) by 295 days.

(21) Appl. No.: 17/873,022

(22) Filed: Jul. 25, 2022

(65) Prior Publication Data

US 2023/0342252 A1 Oct. 26, 2023

Related U.S. Application Data

(60) Provisional application No. 63/334,484, filed on Apr. 25, 2022.

(51) Int. Cl.
  *G06F 11/14* (2006.01)
  *G06F 16/11* (2019.01)

(52) U.S. Cl.
  CPC ...... *G06F 11/1417* (2013.01); *G06F 11/1469* (2013.01); *G06F 16/116* (2019.01); *G06F 2201/84* (2013.01)

(58) Field of Classification Search
  None
  See application file for complete search history.

(56) References Cited

U.S. PATENT DOCUMENTS

| | | | | |
|---|---|---|---|---|
| 8,578,203 | B2* | 11/2013 | Lubars | G06F 11/1469 714/4.11 |
| 2008/0291790 | A1* | 11/2008 | Brondijk | G11B 20/1217 369/47.13 |
| 2012/0054477 | A1* | 3/2012 | Lubars | G06F 11/1469 713/300 |
| 2012/0110378 | A1* | 5/2012 | Fan | G06F 11/1666 714/15 |
| 2012/0216075 | A1* | 8/2012 | Stakutis | G06F 11/1417 714/E11.137 |
| 2014/0365823 | A1* | 12/2014 | Michihata | G06F 11/1469 714/16 |

* cited by examiner

Primary Examiner — Kamini B Patel

(57) ABSTRACT

A new approach is proposed that contemplates systems and methods to support quick recovery of an appliance by adopting a multi-layered filesystem having a plurality of layers that enables recovery and restoration of the appliance to factory default settings in seconds. In some embodiments, the multi-layered filesystem adopts a copy-on-write paradigm for all I/O operations to the appliance to create and superimpose an overlay layer by copying data from a read-only bottom layer of the appliance for modification and recovery of the appliance. The plurality of layers of the multi-layered filesystem are also tied to a general-purpose reset button or a software interface for implementation of an instant factory reset feature. When a reset signal is sent via the reset button or the software interface, one or more of the plurality of layers of the multi-layered filesystem are modified accordingly to provide a clean factory-reset of the appliance.

24 Claims, 3 Drawing Sheets

SYSTEM AND METHOD FOR QUICK APPLIANCE RECOVERY

CROSS-REFERENCE TO RELATED APPLICATIONS

This application claims the benefit of U.S. Provisional Patent Application No. 63/334,484, filed Apr. 25, 2022, which is incorporated herein in its entirety by reference.

BACKGROUND

An electronic appliance usually includes multiple electronic circuitries, integrated circuits (ICs), memories, processors, and other hardware components. When a piece of software (e.g., firmware) running on the appliance becomes corrupted for any reason, e.g. filesystem corruption, failed software update, storage medium damage, etc., the piece of software needs recovery/repair. Rolling back the piece of software running on the appliance to factory default settings, however, can be a challenging process. With the advance of cheap storage medium and memory, software packages have grown considerably in size and complexity. As a result, the more complex changes the piece of software has made to data-structures and filesystems, the more challenging it is to roll-back those changes in the reverse order and to restore the piece of software to its factory default settings. Furthermore, since many cheap, portable, writeable storage mediums eventually wear out from "write" operations, it is imperative to find a solution that supports swapping out such storage mediums and providing enduring longevity for the usage of the appliance.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
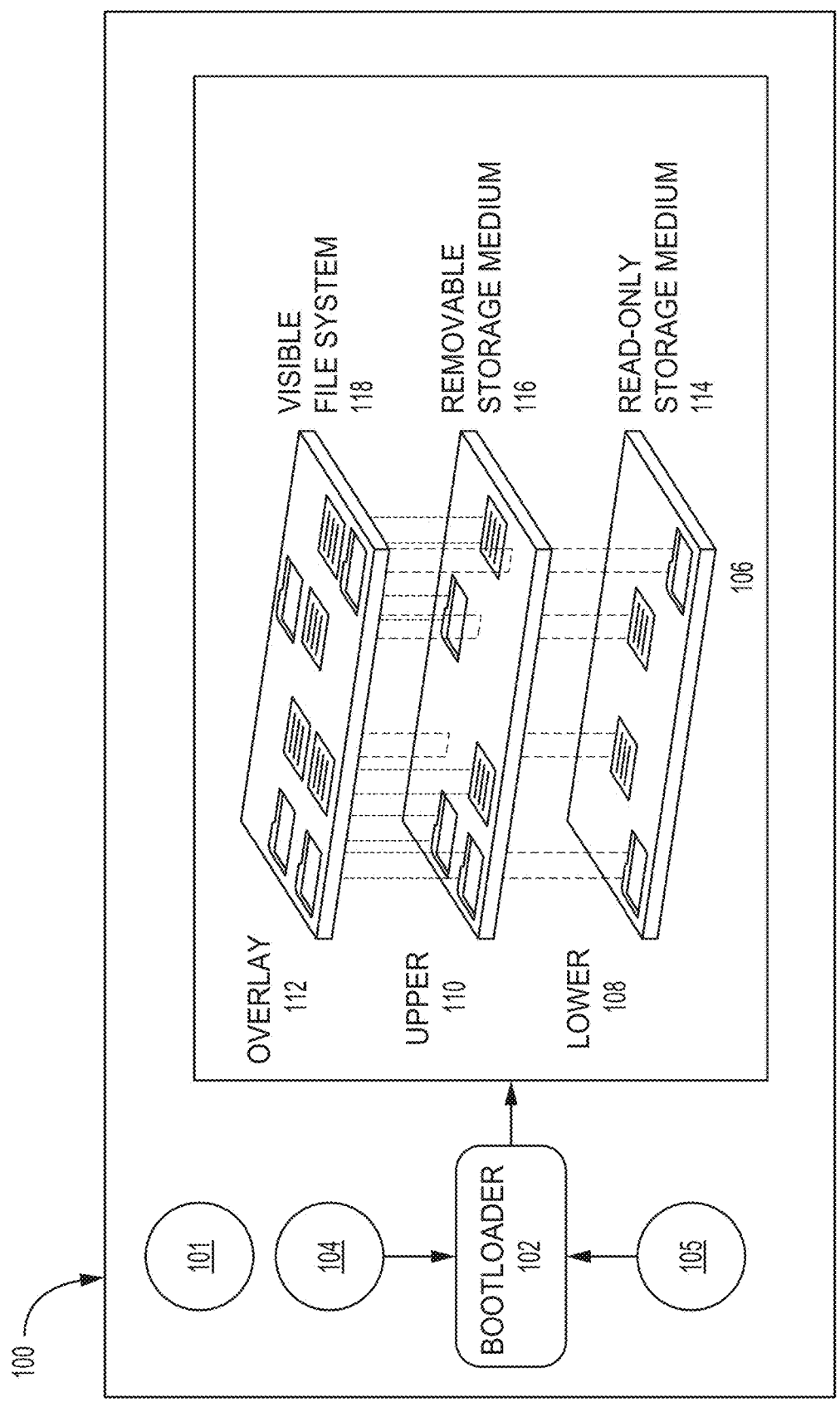
FIG. 1 depicts an example of a system diagram to support quick recovery of an appliance in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support quick recovery of an appliance by adopting a multi-layered filesystem having a plurality of layers, wherein the multi-layered filesystem enables recovery and restoration of the appliance to factory default settings in seconds. In some embodiments, the multi-layered filesystem adopts a copy-on-write mechanism for all I/O operations to the appliance, wherein the copy-on-write mechanism creates and superimposes an overlay layer by copying data from a read-only bottom layer of the appliance for modification and recovery of the appliance. In some embodiments, the plurality of layers of the multi-layered filesystem are also tied to a general-purpose reset button or a software interface for implementation of an instant factory reset feature. When a reset signal is sent via the reset button or the software interface, one or more of the plurality of layers of the multi-layered filesystem are modified accordingly to provide a clean factory-reset of the appliance.

The proposed approach enables filesystem-level writes within the multi-layer filesystem of the appliance and supports pairing and swapping of a writable and wearable storage medium with a read-only storage medium, thus maintaining a pristine source of redundancy and enabling simultaneous restoration of the appliance to factory default settings so that the appliance to be used anew again. The proposed approach not only minimizes any "downtime" for a user of the appliance, but also dramatically shrinks margin for programming bugs in software (e.g., firmware) running on the appliance by eliminating the need for writing code to reverse any I/O operations that took place since the initial configuration of the appliance. Since storage mediums such as removable memory cards wear down inevitably, the proposed approach allows the user of the appliance to self-recover via a quick reset/restore button, should the wearable medium fail, by replacing the writeable storage medium conveniently and creating enduring longevity of usage for the appliance.

FIG. 1 depicts an example of a system diagram to support quick recovery of an appliance. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, wherein the multiple hosts can be connected by one or more networks.

In the example of FIG. 1, an appliance 100 includes at least a bootloader 102, a reset button 104, and a multi-layered file system 106 on a plurality of storage mediums. In some embodiments, the appliance 100 is an industrial-grade device. In some embodiments, the appliance includes one or more processors (not shown) including but not limited to one or more CPUs, network processors, microprocessors, and one or more storage mediums including but not limited to removable/wearable/writable storage mediums and pre-installed/fixed/read-only storage mediums. Each of the storage mediums stores instructions of software/firmware for practicing/running one or more processes of the appliance 100. When the software instructions are loaded and executed by the on the one or more processors, the appliance 100 practices the one or more processes.

In the example of FIG. 1, the multi-layered file system 106 includes a plurality of layers each mapped to a storage medium/device partitioned and/or formatted with a specific file system format. All read and/or write I/O operations to the multi-layered file system 106 of the appliance 100 are read from or written to the storage mediums partitioned and formatted using the specific file system format. Here, the file system format can be but is not limited to, e.g. File Allocation Table (FAT), New Technology File System (NTFS), Fourth Extended File System (ext4), Unix File System (UFS), etc.

As shown by the example of FIG. 1, in some embodiments, the multi-layered file system 106 is configured to create and host a lower layer 108 on an internal read-only storage medium 114, which can be but is not limited to an internal flash storage, e.g., embedded Multi-Media Card (eMMC), reserved to maintain factory default settings of the appliance 100. In some embodiments, the internal read-only storage medium 114 is configured to maintain the operating system and/or recovery data of the appliance 100 in a read-only state to prevent tapering and wearing. In some embodiments, the multi-layered file system 106 is configured to create and host an upper layer 110 on a writable storage medium 116 to which all write operations to the appliance 100 write to. Here, the writable storage medium 116 can be but is not limited to a Secure Digital (SD) card, an USB storage, and any other swappable storage medium that allows read and write operations. Note that the writable storage medium 116 is removable, replaceable, and subject to wear (wearable) during usage. If the writable storage medium 116 fails or is physically damaged, it can be replaced and removed by, e.g., pulling out the damaged storage medium and plugging in a new one. In some embodiments, the multi-layered file system 106 is configured to create a plurality of upper layers 110 by dividing the writable storage medium 116 into a plurality of partitions, wherein each of the plurality of partitions represents an additional upper layer 110 in the multi-layered file system 106. All new data arriving at the appliance 100 and all write operations (e.g. logging, upgrades, application outputs) to the appliance 100 are sent and recorded in one or more of the upper writeable layers 110s of the multi-layered file system 106.

In some embodiments, a set of the plurality of layers of the multi-layered filesystem 106, e.g., the lower layer 108 and one or more of the upper layers 110, are overlayed to present a contiguous, superimposed view of the multi-layered file system 106 in the form of an overlay layer 112 for all further read and/or write operations to view and access. In some embodiments, a write operation based on the overlay layer 112 may be but is not limited to writing flat ascii log files, storing encrypted customer-data, and writing value-pair definitions into a database. In some embodiments, applications of the appliance 100 run on the overlay layer 112 of the multi-layered file system 106. In some embodiments, virtual workloads of the appliance 100, e.g., virtual machines or agents, run on the appliance 100 and/or gain access to the storage mediums of the multi-layered file system 106 via the overlay layer 112.

In the example of FIG. 1, bootloader 102 is configured to implement a recovery logic to reset/reboot the appliance 100 when an issue happens, wherein the recovery logic allows for selective removal of one or more individual (e.g., upper) layers from the multi-layered file system 106 in order to restore and recreate an overlayer 112 of a user's choosing. For a non-limiting example, the bootloader 102 can be but is not limited to U-Boot, which is a primary bootloader used in the appliance 100 to package and utilize a set of instructions used to boot the operating system kernel of the appliance 100. In some embodiments, the recovery logic of the bootloader 102 determines which layers of the multi-layered file system 106 to overlay and in what order to recreate the overlay layer.

Figure 2:
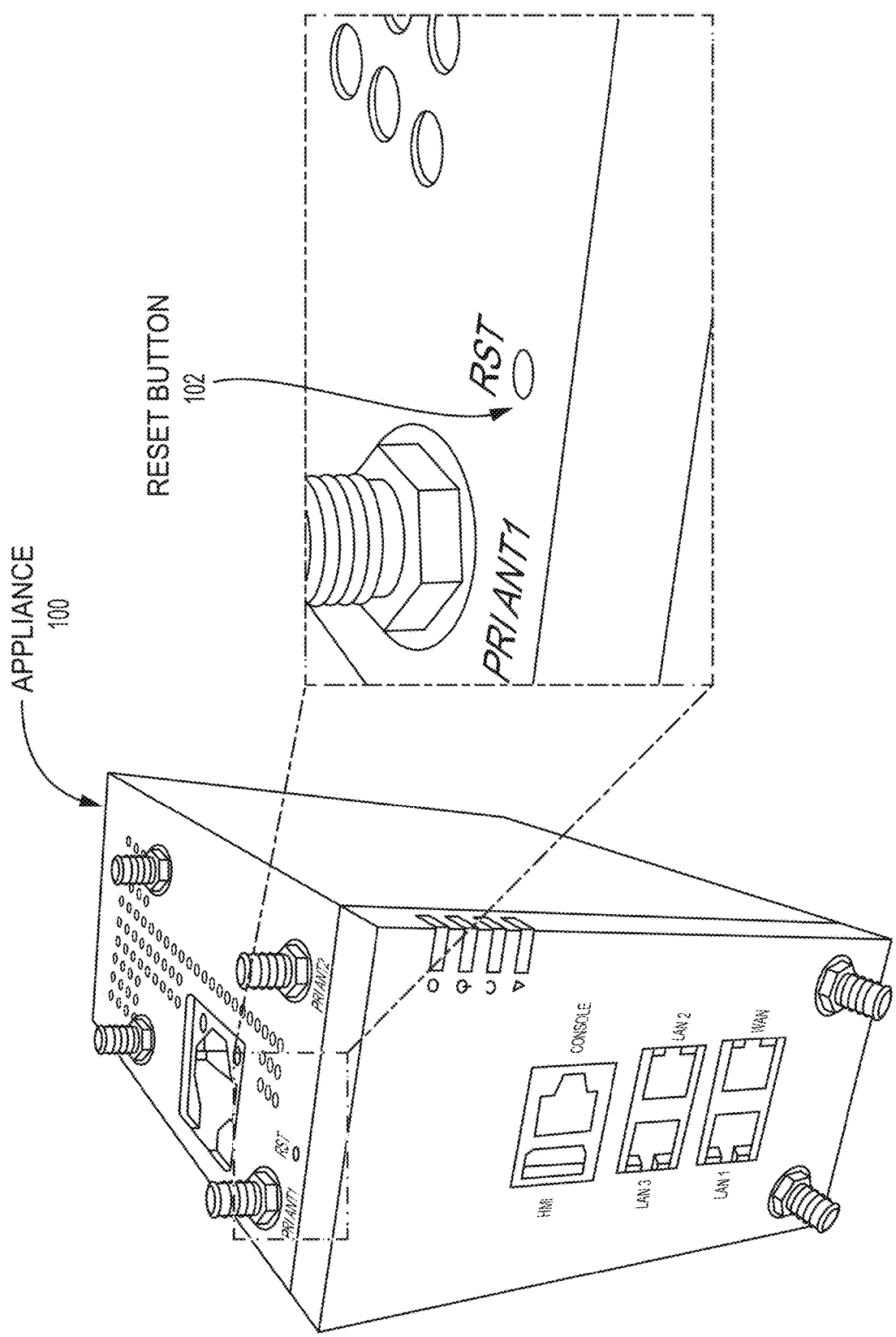
FIG. 2 depicts an example of an industrial-grade appliance having a hardware reset button in accordance with some embodiments.

In the example of FIG. 1, an indicator 101, e.g., one or more LEDs, presents the current status of the appliance 100 to a user and provides an error indication or alert (e.g., by blinking lights) to the user if the appliance 100 is not operating properly and needs to be reset or recovered. A general-purpose input button 104, e.g., a factory reset button, on the appliance 100 is tied to a "factory-reset" mode that triggers/initiates the recovery process of the appliance 100. FIG. 2 depicts an example of an industrial-grade appliance having a hardware reset button 102. When the factory reset button 104 is pressed by the user to start the recovery process, a reset signal is sent to the bootloader 102. In some embodiments, instead of using the hardware reset button 104 as a trigger, a software interface 105 can be utilized by the user to send the reset signal to inform the bootloader 102 which layers to clear and which layers to superimpose again into the overlayer layer 112. The recovery logic of the bootloader 102 captures the reset signal transmitted from the factory reset button 104 or the software interface 105, and informs the bootloader 102 to dump/clear out one or more upper layers 110 that have been corrupted by, e.g., reformatting and/or re-partitioning the writable storage medium 116, and to recreate/superimpose the overlay layer 112 from the factory default settings maintained in the read-only lower layer 108. In some embodiments, the recovery logic of the bootloader 102 clear out the one or more upper layers 110 . The bootloader 102 then validates the overlay layer 112 and bootstraps/resets the appliance 100 by running from the overlay layer 112. At the end of the recovery process, the appliance 100 continues to boot successfully into the operating system and resumes operations. In some embodiments, the indicator 101 stops blinking and turns solid to indicate that the appliance 100 now functions properly. Such copy-on-writes mechanism of omitting code and/or data of certain upper layers 110 and recreating the overlay layer 112 from the factory default settings of the lower layer 108 alone ensures a clean boot process that restores the appliance 100 to the factory default from a new superimposed multi-layer filesystem 106 with the original data from the lower layer 108 maintained in the read-only storage medium (e.g., eMMC) 114 and with the one or more empty (dumped out) upper layers 110 stored in the writable storage medium (e.g., the SD card).

Subsequent to the reset of the appliance 100, all new I/O operations get recorded to the upper layers 110 anew. In some embodiments, software modifications are included in the core applications and/or components running on the appliance 100 to ensure that the core applications and/or components write to the appropriate locations, e.g., correct disposable partitions, on one or more upper layers 110 of the superimposed multi-layer filesystem 106 so that the recovery logic of the bootloader 102 may work properly and does not break. Since the bootloader 102 is configured to support superimposing multiple layers, e.g., up to 128 layers, in the multi-layer filesystem 106, in some embodiments, the bootloader 102 is configured to designate one or more of the layers as checkpoints, wherein each of the checkpoints is used to determine which of the layers are to be superimposed into the overlay layer 112 and in which order.

Figure 3:
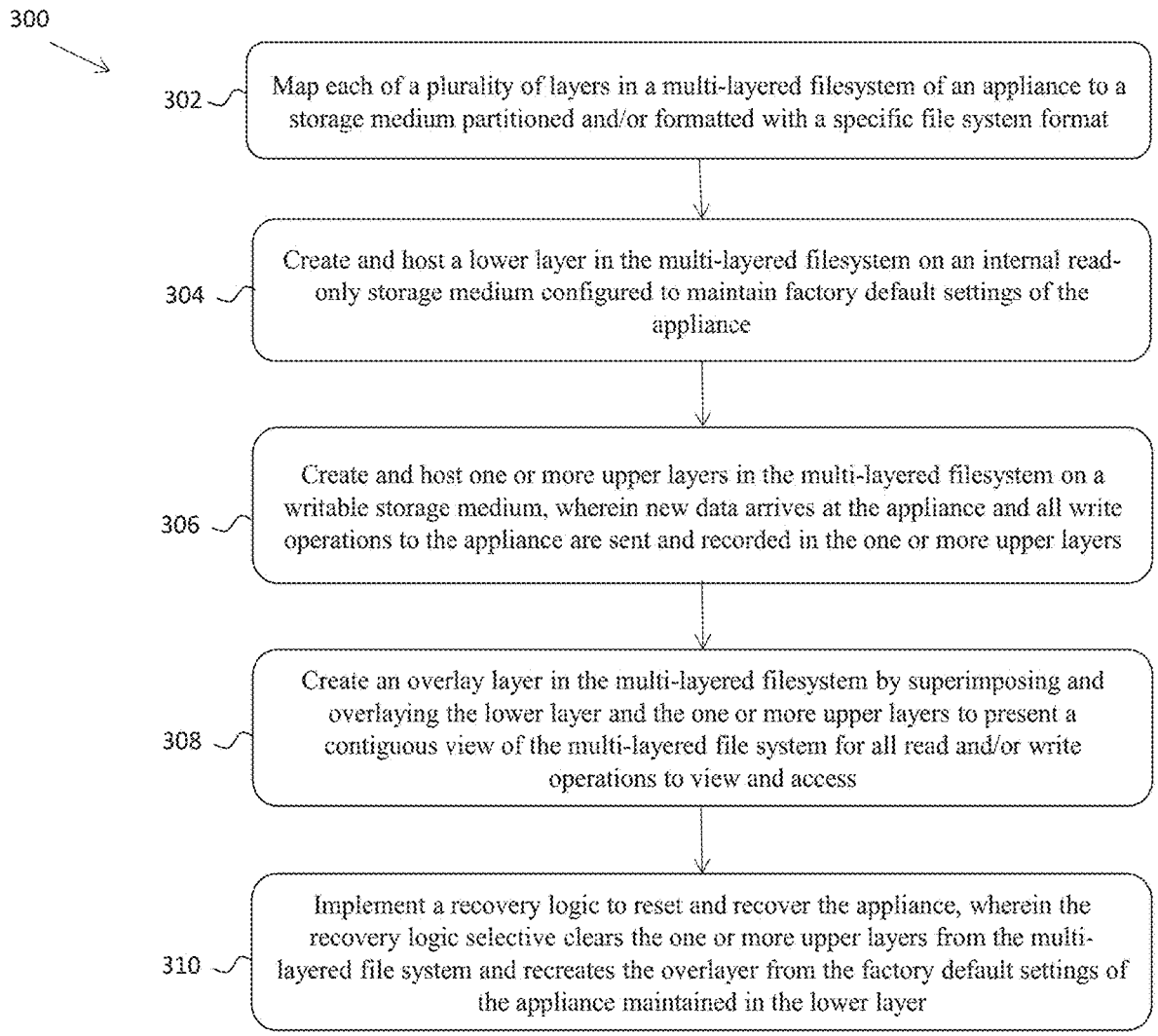
FIG. 3 depicts an example of a flowchart of a process to support quick recovery of an appliance in accordance with some embodiments.

FIG. 3 depicts a flowchart 300 of an example of a process to support quick recovery of an appliance. Although the figure depicts functional steps in a particular order for purposes of illustration, the processes are not limited to any particular order or arrangement of steps. One skilled in the relevant art will appreciate that the various steps portrayed in this figure could be omitted, rearranged, combined, and/or adapted in various ways.

In the example of FIG. 3, the flowchart 300 starts at block 302, where each of a plurality of layers in a multi-layered filesystem of the appliance is mapped to a storage medium partitioned and/or formatted with a specific file system format. The flowchart 300 continues to block 304, where a lower layer in the multi-layered filesystem is created and hosted on an internal read-only storage medium configured to maintain factory default settings of the appliance. The flowchart 300 continues to block 306, where one or more upper layers in the multi-layered filesystem are created and hosted on a writable storage medium, wherein new data arrives at the appliance and all write operations to the appliance are sent and recorded in the one or more upper layers. The flowchart 300 continues to block 308, where an overlay layer in the multi-layered filesystem is created by superimposing and overlaying the lower layer and the one or more upper layers to present a contiguous view of the multi-layered file system for all read and/or write operations to view and access. The flowchart 300 ends at block 310, where a recovery logic is implemented to reset and recover the appliance, wherein the recovery logic selective clears the one or more upper layers from the multi-layered file system and recreates the overlayer from the factory default settings of the appliance maintained in the lower layer.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support recovery of an appliance, comprising:
   a memory component configured to store multi-layered filesystem of the appliance and a bootloader, wherein the multi-layered filesystem comprises a plurality of layers each mapped to a storage medium partitioned and/or formatted with a specific file system format, wherein the plurality of layers include:
   a lower layer created and hosted on an internal read-only storage medium configured to maintain factory default settings of the appliance;
   one or more upper layers created and hosted on a writable storage medium, wherein new data arrives at the appliance and all write operations to the appliance are sent and recorded in the one or more upper layers;
   an overlay layer created by superimposing and overlaying the lower layer and the one or more upper layers to present a contiguous view of the multi-layered file system for all read and/or write operations to view and access;
   the bootloader configured to implement a recovery logic to reset and recover the appliance, wherein the recovery logic selective clears the one or more upper layers from the multi-layered file system and recreates the overlay layer from the factory default settings of the appliance maintained in the lower layer.

2. The system of claim 1, further comprising:
a reset button tied to a factory-reset mode of the appliance and configured to send a reset signal to the bootloader to initiate a recovery process of the appliance when triggered.

3. The system of claim 1, further comprising:
a software interface configured to inform the recovery logic of the bootloader which layers to clear and what layers to be recreated into the overlay layer.

4. The system of claim 1, further comprising:
an indicator configured to present current status of the appliance to a user and provide an error indication or alert to the user if the appliance needs to be reset or recovered.

5. The system of claim 1, wherein:
the file system format is one of File Allocation Table (FAT), New Technology File System (NTFS), Fourth Extended File System (ext4), and Unix File System (UFS).

6. The system of claim 1, wherein:
the internal read-only storage medium is an internal flash storage.

7. The system of claim 1, wherein:
the internal read-only storage medium is configured to maintain an operating system and/or recovery data of the appliance in a read-only state to prevent tapering and wearing.

8. The system of claim 1, wherein:
the writable storage medium is one of a Secure Digital (SD) card, an USB storage, and any swappable storage medium that allows read and write operations.

9. The system of claim 1, wherein:
the one or more upper layers are created by dividing the writable storage medium into a plurality of partitions, wherein each of the plurality of partitions represents an additional upper layer in the multi-layered file system.

10. The system of claim 1, wherein:
an application and/or a virtual workload of the application run on the appliance and/or gain access to the storage mediums of the multi-layered file system via the overlay layer.

11. The system of claim 1, wherein:
the bootloader is configured to utilize a set of instructions used to boot an operating system kernel of the appliance.

12. The system of claim 1, wherein:
the bootloader is configured to validate the overlay layer and bootstrap the appliance by running from the overlay layer.

13. The system of claim 1, wherein:
the bootloader is configured to designate one or more of the layers as checkpoints, wherein each of the checkpoints is used to determine which of the layers are to be superimposed into the overlay layer and in which order.

14. A method to support recovery of an appliance, comprising:
mapping each of a plurality of layers in a multi-layered filesystem of the appliance to a storage medium partitioned and/or formatted with a specific file system format;
creating and hosting a lower layer in the multi-layered filesystem on an internal read-only storage medium configured to maintain factory default settings of the appliance;

creating and hosting one or more upper layers in the multi-layered filesystem on a writable storage medium, wherein new data arrives at the appliance and all write operations to the appliance are sent and recorded in the one or more upper layers;

creating an overlay layer in the multi-layered filesystem by superimposing and overlaying the lower layer and the one or more upper layers to present a contiguous view of the multi-layered file system for all read and/or write operations to view and access;

implementing a recovery logic to reset and recover the appliance, wherein the recovery logic selective clears the one or more upper layers from the multi-layered file system and recreates the overlay layer from the factory default settings of the appliance maintained in the lower layer.

15. The method of claim 14, further comprising:

tying a reset button tied to a factory-reset mode of the appliance, wherein the reset button is configured to send a reset signal to a bootloader to initiate a recovery process of the appliance when triggered.

16. The method of claim 14, further comprising:

informing the recovery logic which layers to clear and what layers to be recreated into the overlay layer via a software interface.

17. The method of claim 14, further comprising:

presenting current status of the appliance to a user and providing an error indication or alert to the user if the appliance needs to be reset or recovered via an indicator.

18. The method of claim 14, further comprising:

maintaining an operating system and/or recovery data of the appliance in a read-only state to prevent tapering and wearing via the internal read-only storage medium.

19. The method of claim 14, further comprising:

creating the one or more upper layers by dividing the writable storage medium into a plurality of partitions, wherein each of the plurality of partitions represents an additional upper layer in the multi-layered file system.

20. The method of claim 14, further comprising:

running an application and/or a virtual workload of the application on the appliance and/or gaining access to the storage mediums of the multi-layered file system via the overlay layer.

21. The method of claim 14, further comprising:

utilizing a set of instructions used to boot an operating system kernel of the appliance.

22. The method of claim 14, further comprising:

validating the overlay layer and bootstrap the appliance by running from the overlay layer.

23. The method of claim 14, further comprising:

designating one or more of the layers as checkpoints, wherein each of the checkpoints is used to determine which of the layers are to be superimposed into the overlay layer and in which order.

24. A system to support recovery of an appliance, comprising:

a processor; and a memory, storing a set of instructions, that when executed by the processor, causes:

mapping each of a plurality of layers in a multi-layered filesystem of the appliance to a storage medium partitioned and/or formatted with a specific file system format;

creating and hosting a lower layer in the multi-layered filesystem on an internal read-only storage medium configured to maintain factory default settings of the appliance;

creating and hosting one or more upper layers in the multi-layered filesystem on a writable storage medium, wherein new data arrives at the appliance and all write operations to the appliance are sent and recorded in the one or more upper layers;

creating an overlay layer in the multi-layered filesystem by superimposing and overlaying the lower layer and the one or more upper layers to present a contiguous view of the multi-layered file system for all read and/or write operations to view and access;

implementing a recovery logic to reset and recover the appliance, wherein the recovery logic selective clears the one or more upper layers from the multi-layered file system and recreates the overlay layer from the factory default settings of the appliance maintained in the lower layer.

* * * * *